Figure 1:
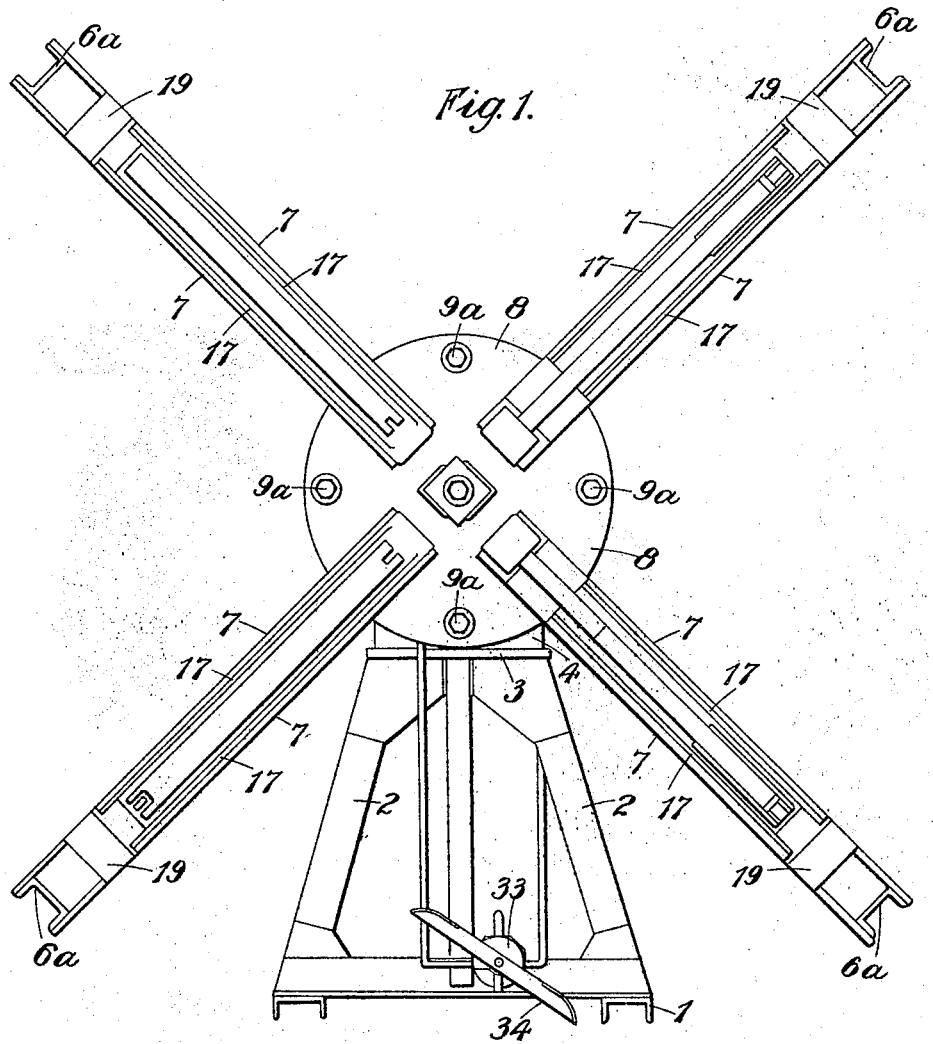

Aug. 16, 1932.   H. WILLSHAW ET AL   1,871,642
APPARATUS FOR REMOVING FLEXIBLE CORES SUCH AS AIR BAGS FROM TIRE COVERS
Filed March 31, 1931   4 Sheets-Sheet 1

INVENTORS
Harry Willshaw and
Leonard S. Blanchard
by Hsina & Rauber Attorneys

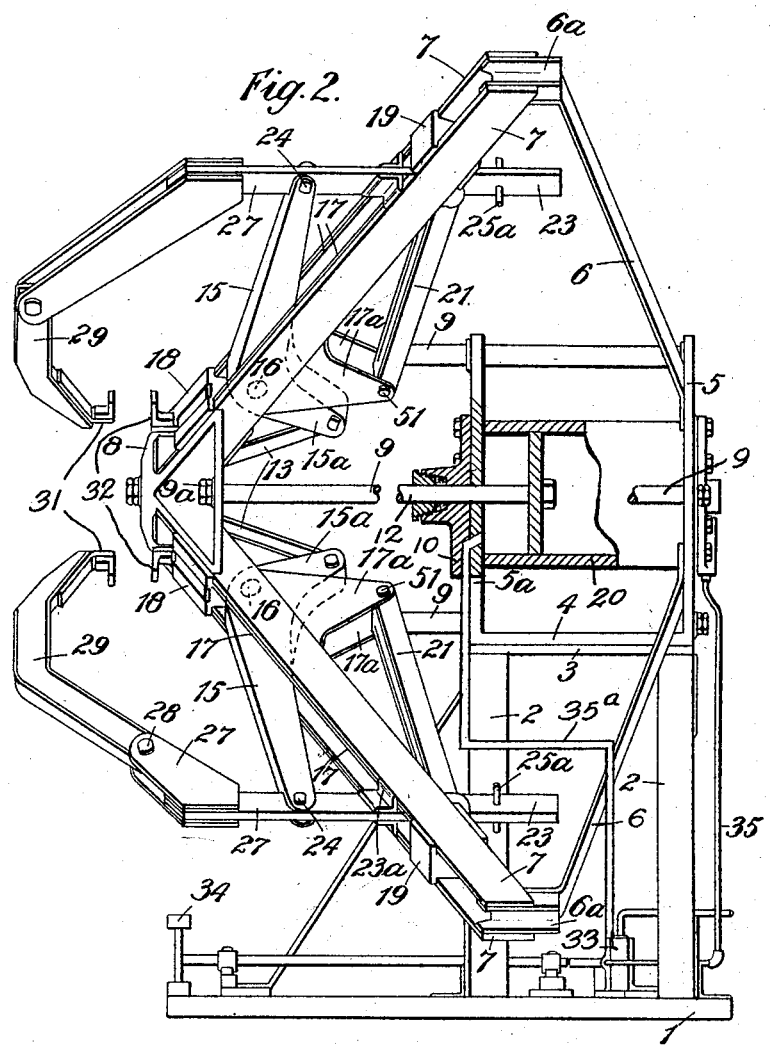

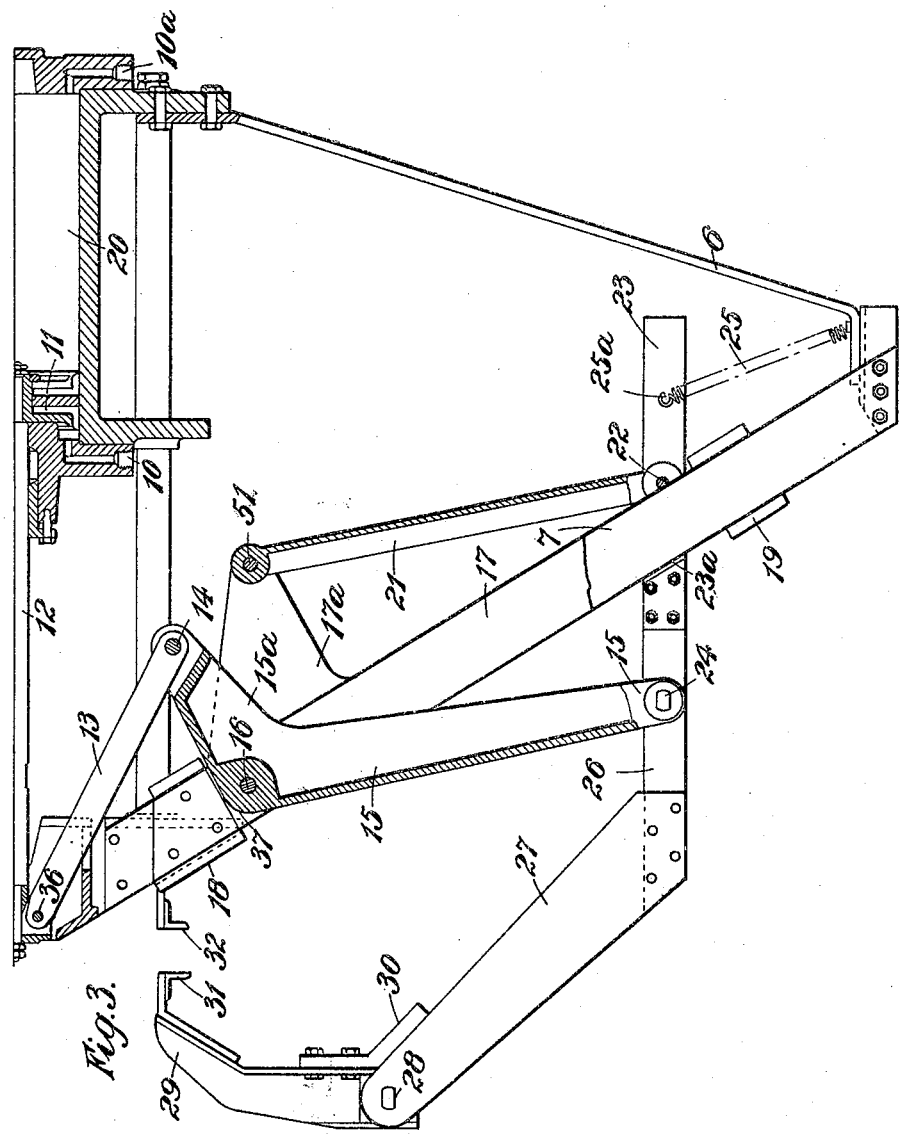

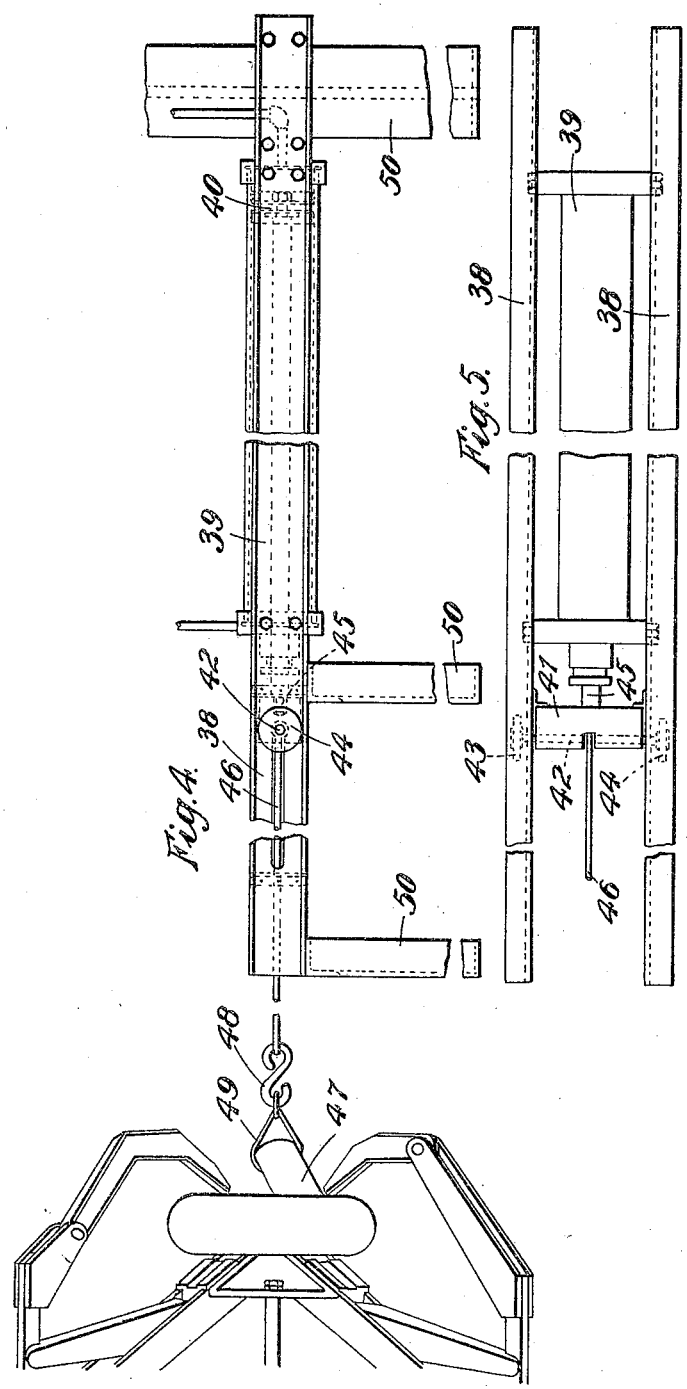

Patented Aug. 16, 1932

1,871,642

UNITED STATES PATENT OFFICE

HARRY WILLSHAW, OF SUTTON COLDFIELD, AND LEONARD SINNETT BLANCHARD, OF HAMSTEAD, BIRMINGHAM, ENGLAND, ASSIGNORS TO DUNLOP RUBBER COMPANY LIMITED, A BRITISH CORPORATION

APPARATUS FOR REMOVING FLEXIBLE CORES SUCH AS AIR BAGS FROM TIRE COVERS

Application filed March 31, 1931, Serial No. 526,664, and in Great Britain April 4, 1930.

This invention concerns improvements in apparatus for removing flexible cores or air bags from tire covers.

It is common practice at the present time to use flexible cores to sustain pneumatic tire covers from within during the period of vulcanization within the mould, such ores commonly taking the form of air bags.

It will be apparent that the larger size of tires such as the ballon and tires of the giant type generally are difficult to handle and that manual separation of the beads at each edge of the inner divided periphery of such tires entails considerable effort by those employed manually to insert or to remove the cores, particularly when reinforced with inextensible members imbedded therein.

In one form of apparatus proposed for stripping covers from flexible cores it has been proposed to separate the beads more or less locally by a member having a pair of movable fingers, each of which engages one of the beads at that point.

One of the objects of this invention is to provide apparatus characterized in that the members which engage the beads are self adjusting to the beads of covers of dissimilar diameter, and furthermore that they separate the beads in substantially parallel relation around the whole of the internal periphery of the cover.

According to this invention we provide apparatus for removing flexible cores such as air bags from tire covers comprising a plurality of similar linkages actuated by movable means common to each so as to engage a bead at a plurality of points, and in which the continued actuation of the linkages separates the beads in parallel relation.

In order that our invention may be more easily understood and readily carried into effect, the same will now be described with reference to the accompanying drawings, in which:—

Fig. 1 is a part front view of the machine;
Fig. 2 is a part side view;
Fig. 3 is a part sectional elevation to an enlarged scale of the lower half of the machine showing one of the linkages and its connection to the piston in more detail.

Fig. 4 is a part side elevation of air bag extracting apparatus;
Fig. 5 is a part plan view of the apparatus shown in Fig. 4.

On a suitable base 1 are positioned uprights 2 carrying a platform 3. Upon the platform 3 is secured a framework 4 having at one side a vertical member 5 from which radiate four members 6 the outer ends of which are provided with spacing members 6a to which are attached the members 7 between which part of the mechanism operates.

The convergent ends of the members 7 are secured to a boss 8 and the triangulated structure so formed is positioned and secured to the members 5 and 5a of the frame 4 by suitable tie bars 9 and nuts 9a.

From the general arrangement shown in Figs. 1 and 2 it will be apparent that four identical groups of parallel linkages diverge symmetrically from a horizontal line passing through the centre of the boss 8. One of these linkages and bead engaging members is shown to a greater scale in Fig. 3. From this figure it will be seen that fluid may be admitted to the cylinder 20 by a port 10 whereupon the piston 11 moves to the right taking with it the piston rod 12. To the free end or head of the piston rod is pivoted by one end a connecting rod 13 the inner end of which is pivoted at 14 to a bell crank 15.

The bell crank 15 may thus be given angular displacement about the pivot 16 the ends of which are set in two parallel spaced members 17, only one of which is shown in Fig. 3, where the frame member 7 is broken away to enable the member 17 to be seen more clearly.

The members 17 are slidable in the members 7 and are joined at their upper and lower ends by guide plates 18 and 19 which guide them in sliding engagement with the members 7. The members 17, and with them the bell crank 15, slide downwardly as a whole when the resistance to the turning of the bell crank is greater than the resistance to the sliding of these members.

The pairs of members 17 are formed at one end with projecting webs 17a and these form that side of each parallel linkage which may be conveniently called the inner side. Between the ends of these webs 17a is pivoted at 51 a link 21 which is again pivoted at 22 as shown in Fig. 3 to the outermost link member 23, both the members 21 and 23 being movable within limits between the members 17 which slide up and down between members 7. The pivot 24 connects the member 23 to the bell crank 15 and completes the parallelogram formed by the linkage.

A spring load is applied to the member 23 by a spring 25 one end of which is conveniently attached to a peg 25a passing through the outer link 23, the other end being made fast to the member 6 where it is fastened to the channel member 6a.

The member 23 is extended beyond the pivot 24 and to this extension 26 is secured a bracket 27 the free end of which contains a pivot 28 which supports a movable arm 29, the preferred construction of which is shown in detail in Fig. 3 from which it will be seen that the arm 29 may be rotated anticlockwise about the pivot 28 but is prevented by a suitable stop 30 from moving further in a clockwise direction than the position shown.

To the tip of the arm 29 is attached a hook 31 one of four bead engaging members which are moved by the outer links of the several parallel linkages.

The inner bead of the tire is engaged by inner bead engaging hooks 32 which are secured to the slides 18. Movement of the linkages therefore causes simultaneous movements in both the bead engaging members 31 and 32, which are shown in Fig. 3.

A valve 33 of known type may be positioned for operation in any convenient manner by a pedal 34, depression of the pedal on one end causing fluid to flow through the pipe 35 (Fig. 2) to one end of the cylinder through the port 10a, depression of the other end of the pedal admitting fluid through another pipe 35a to the port 10 at the opposite end of the cylinder.

Prior to use the operative throws back the hook ended arm 29 so that this depends from the pivot 28 and gives space for access to the inner bead engaging members 32. The tire is then lifted and lowered so that it is supported by that bead engaging member not shown in Fig. 3 which is above and opposite to that shown at 32. The linkages are so proportioned to the range of tires to be operated upon by the machine that the smallest diameter across the bead engaging members, that is when they are centred, is less than the least diameter across the beads of the range of tires from which the deflated core is to be removed. Expansion to the required diameter is effected automatically as follows.

On admitting pressure fluid to the cylinder by the port 10 the piston is moved to the right hand side of the cylinder shown in Fig. 3.

The connecting rod 13 is pivoted to the head of the piston rod at 36; the movement of the piston rod therefore causes the connecting rod 13 to move substantially in the direction of its own length and to turn the bell crank 15 through an angle about its pivot 16.

The outer ends of the members 15 and 21 consequently move to the left and at the same time the member 23 moves to the left and drops slightly in so doing, being assisted in this movement by the spring 25. A stop 23a fastened to the outer link 23 limits the return movement of the link 23 to the right by engaging the member 7.

Contact between the outer link 23 and the sliding guide 19 is thus effected and the guide 19 is pushed down the member 7, thus pulling down the whole of the linkage by the simultaneous movement of the sliding guide 18 to which it is attached by the members 17, a shoulder of the slide 18 engaging the angle of the bell crank 15.

It is assumed that the arm 29 of the outer bead engaging members has been thrown to the position shown in Fig. 3 at some convenient time prior to withdrawal of the piston. This being so, the inner circle of hooks 32 have moved into contact with one of the inextensible beads at four points and so hold the tire definitely by one bead in a certain position.

The members 18 are now prevented from moving, which has the effect of causing the linkage to move about the fixed pivot point 16.

The movement of the piston rod into the cylinder being continued, the outer end of the lever 15 forming part of the bell crank is moved to the left and carries with it the hook 31, and this engages the inner surface of the outer bead. The inner bead is thus automatically engaged, the outer bead semi-automatically engaged, and both beads are automatically separated in parallel relation.

The beads of the tire, now separated, expose the core which may be removed manually with suitable tire levers.

While we may partly dislodge the core manually, we prefer to associate with the machine before described additional mechanism to replace the manual labour otherwise required to complete the operation.

In Figs. 4 and 5 we illustrate one form which the apparatus may take.

On a horizontal plane substantially coinciding with the plane of the piston rod is carried a pair of spaced parallel girders 38 carried on uprights 50 and supporting between them a cylinder 39 with a piston 40 of known type actuated by valves in known manner, the piston rod head 45 being attached to a cage 41 provided with an axle 42 having guide wheels 43, 44 which support the comparatively lengthy piston rod when travelling to and from its fully extended position, and prevent it being strained by variations in the direction in which the pulling force is applied to the core.

To the axle 42 is pivotally connected a rod or link 46 the free end of which is provided with a hook 48 and a detachable fabric or other band 49 which may be passed around the partly withdrawn core 47 in the manner diagrammatically shown.

The travelling carriage or cage 41 with its guides 43 and 44 in conjunction with the free vertical space between the uprights 50 permits any part of the core to be chosen, as may be convenient, for the attachment of the band 49, so that the core may be pulled out from either side or from the top or the bottom of the separated beads by retraction of the piston 40.

Having now particularly described and ascertained the nature of our said invention and in what manner the same is to be performed, we declare that what we claim is:

1. Apparatus of the type described which comprises pairs of tire bead engaging hooks at intervals spaced about a circle, transmission linkages for said pairs of hooks to displace the hooks of each pair radially outwardly and then to displace them in an axial direction, common actuating mechanism for actuating said mechanism simultaneously, said transmission linkage comprising a slidable member, a bell crank lever pivoted thereon and having one arm connected to said common actuating means, a link mounted on said slidable member, and a frame member connected to the other end of said bell crank lever and to said link, one hook of said pair being mounted on said frame member and the other on said slidable member.

2. Apparatus of the type described which comprises pairs of tire bead engaging hooks at intervals spaced about a circle, transmission linkages for said pairs of hooks to displace the hooks of each pair radially outwardly and then to displace them in an axial direction, common actuating mechanism for actuating said mechanism simultaneously, said transmission linkage comprising a slidable member, a bell crank lever pivoted thereon, a link mounted on said slidable member, and a frame member connected to the other end of said bell crank lever and to said link, a hinged member carrying one of said hooks and pivotally mounted on said frame member to swing outwardly, and a stop to limit its inward swing, the other hook of said pair being mounted on said slidable member.

3. Apparatus of the type described which comprises pairs of tire bead engaging hooks at circularly placed intervals, a parallel link motion mechanism carrying one hook of said pair and actuated to give said hook a motion to and from the other hook of said pair, and a slidable member supporting said linkage and said other hook of said pair and slidable to give said hooks a radially outward motion.

4. Apparatus of the type described which comprises pairs of tire bead engaging hooks at circularly placed intervals, a parallel link motion mechanism carrying one hook of said pair and actuated to give said hook a motion to and from the other hook of said pair, a slidable member supporting said linkage and said other hook of said pair and slidable to give said hooks a radially outward motion, and a common driving mechanism for the link and sliding elements of said pairs of hooks.

5. Apparatus of the type described which comprises pairs of tire bead engaging hooks at circularly placed intervals, a parallel link motion mechanism carrying one hook of said pair and actuated to give said hook a motion to and from the other hook of said pair, a slidable member supporting said linkage and said other hook of said pair and slidable to give said hooks a radially outward motion, and means for resiliently drawing said link mechanism in a direction radially outward and axially in a direction toward the opposite hook.

6. Apparatus of the type described which comprises pairs of tire bead engaging hooks at circularly placed intervals, a parallel link motion mechanism carrying one hook of said pair and actuated to give said hook a motion to and from the other hook of said pair, a slidable member supporting said linkage and said other hook of said pair and slidable to give said hooks a radially outward motion, a fluid actuating piston, and means for driving each of said link and slidable mechanisms simultaneously from said piston.

7. Apparatus of the type described comprising a plurality of linkages each comprising a parallelogram of pivoted members, a member movable in the plane of said linkage and pivotally connected to a member of said linkage and in a position diagonal to the parallelogram formed by said linkage, a sliding member carrying said linkage, a pair of hooks one connected to said sliding member and the other to said linkage, and means for actuating said sliding member and said linkage to move said hooks radially outwardly and to separate them axially.

In witness whereof we have hereunto signed our names.

HARRY WILLSHAW.
LEONARD SINNETT BLANCHARD.